United States Patent [19]

Lucas

[11] Patent Number: 5,448,600
[45] Date of Patent: Sep. 5, 1995

[54] METHOD FOR SELECTING PROPAGATION PATHS RETAINED FOR RECEIVING MESSAGES TRANSMITTED BY CDMA RADIOCOMMUNICATION

[75] Inventor: Philippe Lucas, Palaiseau, France

[73] Assignee: Matra Communication, France

[21] Appl. No.: 289,435

[22] Filed: Aug. 12, 1994

[30] Foreign Application Priority Data

Aug. 13, 1993 [FR] France .................. 93 09958

[51] Int. Cl.$^6$ ............................................. H04J 13/02
[52] U.S. Cl. ....................................... 375/205; 375/200;
380/34; 370/18; 455/63; 455/65; 455/67.1;
455/67.3
[58] Field of Search ................. 375/1; 380/34; 370/18;
455/63, 65, 67.1, 67.3

[56] References Cited

U.S. PATENT DOCUMENTS

| | | | |
|---|---|---|---|
| 2,982,853 | 5/1961 | Price et al. ........................ | 375/1 X |
| 5,101,501 | 3/1992 | Gilhousen et al. ................. | 455/33.2 |
| 5,109,390 | 4/1992 | Gilhousen et al. ................. | 375/1 |
| 5,233,626 | 8/1993 | Ames ................................... | 375/1 |
| 5,237,586 | 8/1993 | Bottomley ........................... | 375/1 |
| 5,305,349 | 4/1994 | Dent .................................... | 375/1 |
| 5,315,615 | 5/1994 | DeLisle et al. ..................... | 375/1 |
| 5,315,616 | 5/1994 | DeLisle et al. ..................... | 375/1 |
| 5,335,248 | 8/1994 | Snodgrass ........................... | 375/1 |
| 5,343,495 | 8/1994 | Lovell et al. ....................... | 375/1 |
| 5,347,536 | 9/1994 | Meehan ............................... | 375/1 |
| 5,349,606 | 9/1994 | Lovell et al. ....................... | 375/1 |

OTHER PUBLICATIONS

Electronics Letters, vol. 29, N°4, Feb. 18, 1993, Stevenage, GB pp. 395–396, S. S. H. Wijayasuriya et al "Rake decorrelating receiver for DS-CDMA Mobile radio networks".

IEEE International Conference on Communications 1993, vol. 1, May 1993, Geneva, CH; pp. 463–467, R. Esmailzadeh "Pre-rake Diversity Combination for Direct Sequence Spread Spectrum Communications systems".

IEEE Transactions on Communications, vol. COM-30, N°5, May 1982 "Theory of Spread-Spectrum Communications-A Tutorial", R. L. Pickholtz, D. L. Schilling, L. B. Milstein. pp. 855–884.

Primary Examiner—Bernarr E. Gregory
Attorney, Agent, or Firm—Larson and Taylor

[57] ABSTRACT

Each path is identified by a delay which is applied to at least one spreading sequence for determining a correlation between the received signal ans said spreading sequence. For each selected delay, a reception energy, contained in the CDMA signal consisting of a correlation between the received signal and a reference spreading sequence, is estimated. Delays to be tested are randomly chosen with a choice probability having a maximum for a delay substantially equal to the smallest selected delay. The delays thus chosen are tested by estimating the reception energy associated thereto. When the reception energy for a tested delay is greater than at least one of the reception energies associated to the previously selected delays, the tested delay is substituted for the previously selected delay having the smallest reception energy.

6 Claims, 1 Drawing Sheet

METHOD FOR SELECTING PROPAGATION PATHS RETAINED FOR RECEIVING MESSAGES TRANSMITTED BY CDMA RADIOCOMMUNICATION

BACKGROUND OF THE INVENTION

The present invention relates to code-division multiple access (CDMA) radiotelephone communications.

CDMA is a method of spread spectrum digital communication in which a plurality of transmission channels are created by using spreading sequences for each channel that modulate the information bits to be transmitted. The spreading sequences operate at a chip rate higher than the data bit rate in order to a achieve spectrum spreading of the radio signal. Their self- and cross-correlation properties are adapted to enable the various channels to be multiplexed: they are generally pseudo-random sequences that are mutually orthogonal or quasi-orthogonal, taking chip values of $-1$ or $+1$.

The use of CDMA in the field of cellular radiotelephone is described in chapter I of the work "Mobile radio communications" by Raymond Steele, Pentech Press, London 1992, and also in the article "On the system design aspects of code division multiple access (CDMA) applied to digital cellular and personal communications networks" by A. Salmasi and K. S. Gilhousen, Proc. of the 41st IEEE Vehicular Technology Conference, St. Louis, Mo., 19–22 May 1991, and in U.S. Pat. No. 5,103,459.

For the downlinks, the multiplexed transmission channels are formed at the base station of each cell in the network. Each mobile station situated within the cell uses a special spreading sequence to recover, from the overall radio signal transmitted by the base station, the data bits that are addressed thereto. One of the downlink CDMA channels is a pilot channel over which the base station transmits a reference sequence which does not modulate information bits. Reception over the pilot channel enables the mobile stations to be synchronized and to estimate the response of the propagation channel in order to perform coherent demodulation on the other channels.

For the uplinks, each mobile station transmits a radio signal formed by using a particular spreading sequence. A correlation with this sequence enables the base station to recover the information bits transmitted by the mobile station, among the radio signals received from different mobile stations in the cell. There is no pilot channel in the signal transmitted by a mobile station. The base station performs non-coherent demodulation.

For most radiocommunication systems, multiple propagation paths between the transmitter and receiver stations constitute a difficult problem, especially because they cause signal fadings (Rayleigh fading). An important advantage of CDMA is to reduce the disadvantages relating to multiple paths, owing to the spreading of the signal spectrum.

With CDMA, it is even possible to take advantage of the existence of multiple paths to improve the reception performances, by means of spatial diversity techniques. To this end, a rake receiver is used, having several arms each performing reception of the same signals according to a selected propagation path. Each path is identified by a delay which is applied to the spreading sequence for determining a correlation between the received signal and the thereby delayed sequence. The correlations thereby obtained in different arms of the receiver can then be combined to restore the transmitted information bits.

This spatial diversity technique is explained in U.S. Pat. No. 5,109,390. In the system described in the latter document, one of the arm of the rake receiver is used for scanning the time domain to search for new propagation paths. The purpose of such search is to select, for the reception, the paths/delays for which the energy of the received signal after correlation is the most important. The delays are sequentially tested in a preset time window, by determining their associated energy. Each tested delay corresponds to an offset by a integer number of chips of the spreading sequence, which is applied thereto for calculating the correlation. The time window of the tested delays typically has a duration of about 100 $\mu$s, which represents a propagation over about 30 km. Once a delay has been selected and allocated to one arm of the rake receiver, the corresponding path is tracked by means of a tracking loop, of the Costas loop-type, included in this arm. An example of such loop is described in the article "Theory of Spread Spectrum Communications - A tutorial" by R. L. Pickholtz et al., IEEE Trans. on Communications, Vol. COM-30, No. 5, May 1982.

The method of sequentially exploring the paths is reliable, but the applicant has observed that it does not take into account in an optimal way the characteristics of the propagation channel. Indeed, it leads to often test delays corresponding to improbable propagation paths. A consequence is that the selection of a "good" path, i.e. a path for which the received signal has a satisfying energy, is, on average, a relatively long process.

Another observation of the applicant is that, if it were possible to substantially reduce the mean time required for selecting a "good" path, it would be possible, in certain cases, to dispense with the tracking loops usually required in each arm of the rake receiver. This would lead to some loss on the level of the demodulated signal, because the synchronization of the sequences would no more be achieved with a definition finer than the duration of one chip. However, this loss would not be greater than 3 dB, because the worst case would correspond to a time offset by half a chip duration, whereby the instantaneous correlation would become zero when there is a transition in the signal, i.e. for one chip out of two on average, so that the integrated correlation would be reduced by a factor 2. This loss limited to 3 dB can be compensated for by the fact that a more rapid selection process allows for selection of the best paths in a more efficient way, and possibly by other means, for instance by adding one or more arms in the rake receiver. From the point of view of simplifying the demodulators, the suppression of the tracking loops would be an important advantage.

An object of the present invention is to propose a method allowing for a more rapid and efficient selection of the paths.

SUMMARY OF THE INVENTION

The invention thus provides a method for selecting multiple propagation paths retained for receiving messages transmitted in a CDMA radiocommunication system, each path being identified by a delay which is applied to at least one spreading sequence for determining a correlation between the received signal and said spreading sequence, wherein, for each selected delay, a reception energy contained in a CDMA signal consisting of a correlation between the received signal and a reference spreading sequence is estimated, wherein other delays are successively tested by estimating the reception energy or each tested delay and, when the reception energy for a tested delay is greater than at least one of the reception energies associated with the previously selected delays, the tested delay is substituted for the one of the previously selected delays for which the reception energy is the lowest, and wherein the tested delays are randomly chosen with a choice probability having a maximum for a delay substantially equal to the smallest of the selected delays.

The method takes advantage of the fact that, generally, the greater the delay associated with a path, the longer the time during which said path is maintained. On average, it is thus more efficient to search for a path whose delay is small than a path whose delay is important. This is why the choice probability decreases for the delays greater than the smallest selected delay. Besides, the probability of existence of a path having a delay substantially smaller than the smallest selected delay is generally low. For instance, when there is a line-of-sight path between the transmitter and receiver stations, this path is normally selected because its reception energy is important, and the probability of existence of a shorter path is practically zero. It is thus appropriate to provide that the choice probability of the tested delays has a maximum about the smallest selected delay.

When the mobile station is situated in a cell of small dimensions (urban zone), a sequential choice of the tested delays in the long window, or a choice with a uniform probability in the window, causes a lot of time to be lost for selecting a "good" path. According to the invention, the maximum of the choice probability enables to preferably test the paths having a non-negligible probability of existence, and thus to increase the rapidity of the selection process.

DESCRIPTION OF A PREFERRED EMBODIMENT

In a cellular radiotelephone system, base stations are distributed over the territory that is to be covered. In the zone or "cell" covered by a given base station, a plurality of mobile stations may communicate simultaneously with the base station. The method according to the invention is described hereafter in the application to the downlinks, i.e. to the transmission of signals from a base station to mobile stations, for which code-division multiple access (CDMA) is used.

Each base station sets up CDMA channels each defined by a respective spreading sequence CP,C1, ... ,Cm. The spreading sequences, which take the chip values +1 or −1, are periodic, pseudorandom, and substantially decorrelated. They are at a chip rate that is higher than the bit rate of the information bits to be transmitted, for example a chip rate of 1 MHz. In each CDMA channel, the information bits to be transmitted, that represent voice or data signals previously encoded by conventional techniques, are multiplied by the spreading sequence C1, ... ,Cm produced by a suitable generator. Each of the sequences C1, ... ,Cm is characteristic of the user (mobile station) with which a call is established over the corresponding channel.

One of the CDMA channels formed by the base station is a pilot channel, over which a reference spreading sequence CP is transmitted without modulating information bits.

The baseband spread-spectrum signals formed in the different CDMA channels are combined and then modulated on a carrier frequency. The combination consists in a summation or weighted summation, of the baseband signals. The modulation can be binary or quadrature phase shift keying (BPSK or QPSK). The carrier frequency is for instance of 2.4 GHz. The radio signal obtained after modulation is transmitted by the base station towards mobile stations situated in the cell.

Figure 1:
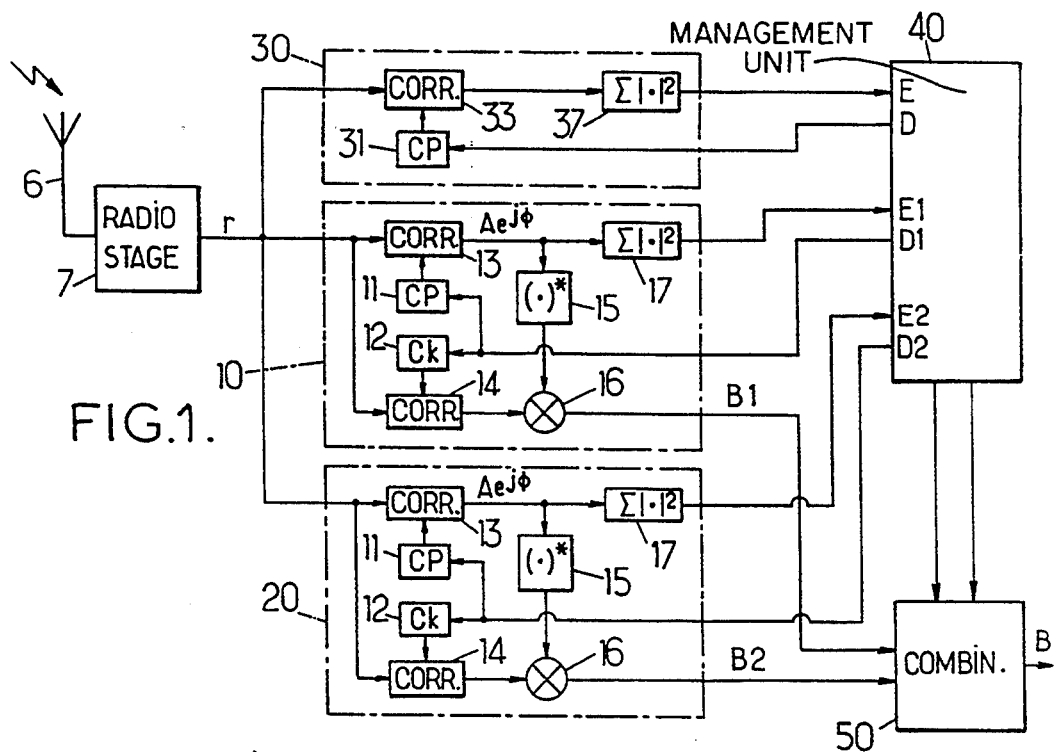
FIG. 1 is a diagram of a rake receiver for implementing the invention.

A receiver of a mobile station is shown in FIG. 1. The radio signal received on antenna 6 is first processed by the radio stage 7 to provide a baseband complex signal r. The complex signal r is digitalized at the output of the radio stage 7 at a rate which is at least equal to the chip rate of the spreading sequences. This signal r includes the CDMA components transmitted by the base station on different CDMA channels. The mobile station can recover the information bits that are addressed thereto by calculating the correlations between the signal r and the spreading sequence Ck assigned thereto.

The receiver of the mobile station is a rake receiver. In the illustrated example, it includes three arms, including two data reception arms 10,20 and one path search arm 30. Each reception arm 10,20 performs reception of the signal according to a propagation path identified by a respective delay D1, D2. The delays D1, D2 are allocated to the reception arms 10,20 by a management unit 40 of the rake receiver.

Each reception arm 10,20 includes a pseudorandom generator 11 which provides the reference spreading sequence CP with the delay D1, D2 allocated by the management unit 40, and a pseudorandom generator 12 which provides the spreading sequence Ck of the mobile station with the same delay D1, D2. This delay D1, D2 correspond to the synchronization of the generators 11,12 with respect to one propagation path between the base station and the mobile station. The synchronized sequence produced by generator 11 is delivered to a correlator 13 which calculates the correlation between this sequence and the received signal r. The synchronized sequence produced by generator 12 is delivered to a correlator 14 which calculates the correlation between this sequence and the received signal r. The correlations are for instance calculated on a duration corresponding to 128 chips of the spreading sequences.

Since no information bit is modulated on the pilot channel, the CDMA signal constituted by the complex output of correlator 13 represents an amplitude and phase estimation $Ae^{j\phi}$ of the channel response along the propagation path under consideration. The complex conjugate of the estimation $Ae^{j\phi}$ is calculated in 15, and then multiplied in 16 by the CDMA signal constituted by the complex output of the correlator 14, in order to produce an estimation B1,B2 of the value of the transmitted bit, which constitutes the output of the reception arm 10,20. Thus, each reception arm of the rake receiver performs coherent demodulation of the signal according to one path.

Each reception arm 10,20 further includes means, represented by block 17, for determining a reception energy E1,E2 contained in the CDMA signal produced by correlator 13. This energy is for instance obtained by summing the square moduli of the estimations $Ae^{j\phi}$ obtained by 10 successive correlation computations. The reception energies E1, E2 are addressed to the management unit 14.

The summation of the estimations B1, B2 is carried out in the combination unit 50 to provide the global estimation B of the received bits. The global estimation B is reliable and not very sensitive to Rayleigh fading, owing to the spatial diversity provided by the rake receiver.

In a practical embodiment of the receiver, a larger number of data reception arms may be provided, for instance 3 or 4 arms, if a greater spatial diversity is desired.

In addition, as described in U.S. Pat. No. 5,109,390, the rake receiver allows for monitoring the signal transmitted by several base stations, to ensure a soft handover when the mobile station is located in the vicinity of a boundary between several cells. The base stations of the neighbouring cells normally transmit different sequences (or the same sequence with important relative shifts, which amounts to the same thing) on their respective pilot channels. The simultaneous monitoring of the signals from another base station can thus be carried out by controlling the generator 11 of one of the reception arms so that it produces the reference sequence assigned to said base station.

When the mobile station is being turned on, the selection of a first propagation path can be carried out as described in French patent application No. 93 07269. Then, the selection of the paths is carried out according to a method of the invention.

The search arm 30 of the rake receiver is used to test delays D which are successively allocated thereto by the management unit 40. The search arm 30 includes a pseudorandom generator 31 which provides the reference spreading sequence CP With the delay D allocated by unit 40. The sequence produced by generator 31 is delivered to a correlator 33 which calculates the correlation between this sequence and the received signal r, in the same manner as the correlators 13 described hereabove. The CDMA signal constituted by the complex output of the correlator 33 represents an estimation of the channel response along the tested path. This estimation is addressed to block 37 which determines a reception energy in the same manner as block 17 described hereabove. The calculated reception energy E is addressed to the management unit 40.

If the reception energy E determined for the tested delay D is greater than at least one of the reception energies E1, E2 associated to the previously selected delays D1, D2, the management unit 40 substitutes the delay D for the previously selected delay D1 or D2 for which the reception energy is the lowest. This ensures that the delays allocated to the reception arms 10, 20 correspond to the paths for which the propagation conditions are the best.

Figure 2:
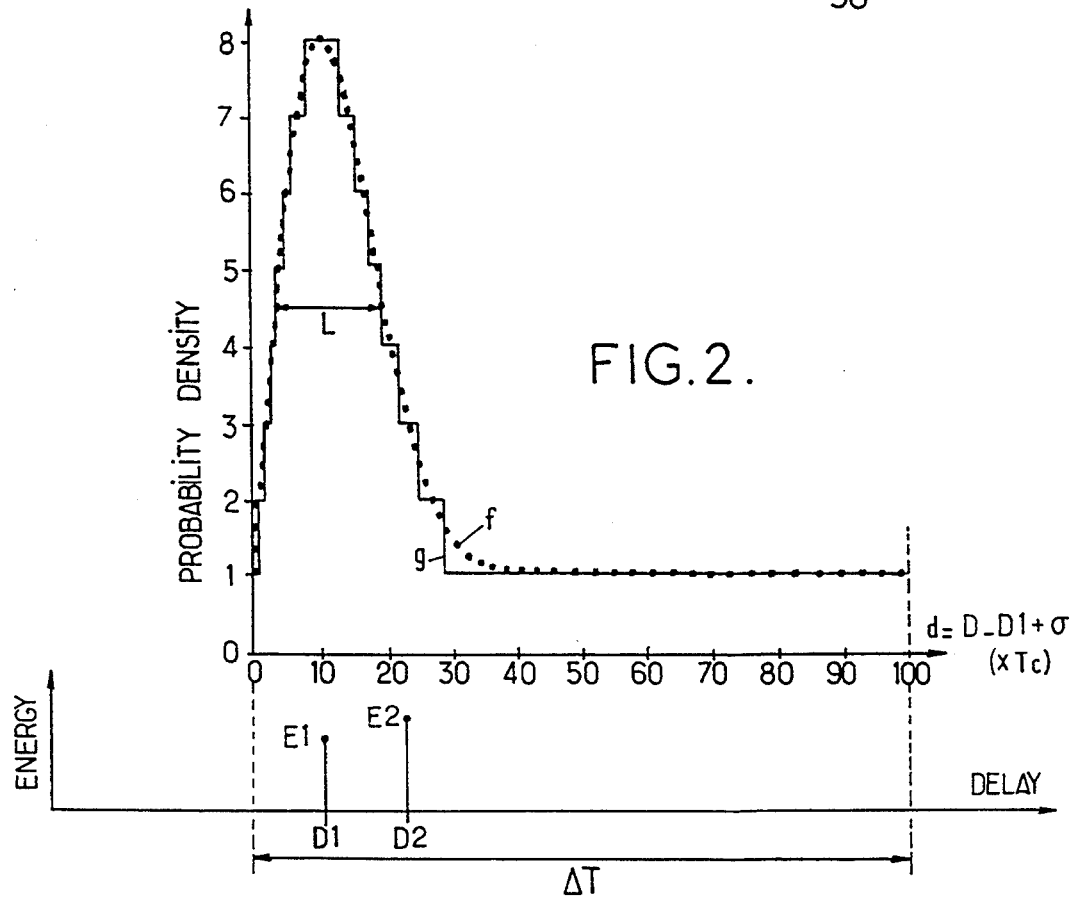
FIG. 2 is a chart illustrating the process of choosing the tested delays.

In the lower diagram of FIG. 2, an example of energy values E1, E2 corresponding to selecting delays D1, D2 is shown, with arbitratry units. Each delay corresponds to an integer number of times the duration Tc of one chip of the spreading sequences. Based on the value of the smallest selected delays (D1 in the illustrated example), unit 40 defines a time window in which the next delay to be tested D will be chosen. The length $\Delta T$ of this window is typically 100 times the duration Tc of one chip of the spreading sequences (i.e. 100 $\mu$s for a chip rate of 1 MHz, which represents a propagation over about 30 km). In this window $\Delta T$, the delay D to be tested is randomly chosen with a choice probability having a law such as the one shown in the upper diagram of FIG. 2. The choice probability has a maximum for the smallest selected delay D1.

The probability density function f shown in a dotted line is an elevated Rayleigh function defined by:

$$f(d) = 1 + \alpha.d.\exp(-d^2/2\sigma^2)$$

where d is an integer number between 0 and 99 representing a delay in the window $\Delta T$, $\sigma$ is a coefficient determining the position of the maximum in the window ($\sigma = 10$ in the illustrated example), and $\alpha$ is a coefficient determining the ratio between the probability at the maximum and the probability at the minimum. Such ratio is typically between 5 and 15 (8 in the illustrated example, so that $\alpha \simeq 11.5/94$).

The choice probability of the tested delays may be the elevated Rayleigh function f or, in a more convenient way for the implementation, a function g corresponding to an approximation by integer increments discretization of the function f, g(d) being defined as the integer which is the closest to f(d). Let N be the integer defined as the sum of the g(d)'s for d between 0 and 99 ($N \simeq 200$ in the illustrated example). The choice of a delay D can be carried out by generating a uniform random variable in the interval [1,N], for instance by means of a conventional pseudorandom generator, and by using this variable as an address to extract a number d from a table where N values of d are stored, each number d being present g(d) times in the table. The delay D to be tested is then obtained by the operation $D = d + D1 - \sigma$. The latter operation further ensures the positionning of the window $\Delta T$ with respect to the smallest previously selected delay D1.

In the example illustrated in FIG. 2, we have E1 < E2. If the reception energy E determined for the tested delay D is greater than E1, the delay D is substituted for the delay D1. If D < D2, the window $\Delta T$ will be positioned with the maximum of f(d) ($d = \sigma = 10$) corresponding to the new delay D for chosing the following delays to be tested. If D > D2, the window will be positioned with the maximum of f(d) corresponding to the delay D2.

The retained probability function f(d) or g(d) has a peak about the value of the smallest delay, the midheight width L of the peak being typically between 5 and 20 $\mu$s (here $L \simeq 15 \times Tc \simeq 15$ $\mu$s). It is in this range L that, a priori, the chances are the highest for finding a new interesting delay. Thus, the choice of the delays takes into account the channel characteristics between the transmitter and receiver stations. It is also important that the minimal probability of choice in the window, for delays far from the peak, be not zero. This minimal probability is about 0.5% in the described example. It must not be zero because there may be energetic paths having delays substantially greater that the smallest delay (typically d > 30), in particular in mountain environments and in the case of handover. But, such long paths are less probable that than the shorter paths, and they are maintained for a relatively long time, so that it is not necessary that the corresponding delays be tested very often, which justifies the low value of the probability for such delays.

With the parameters given hereabove, the test of one delay takes about 1 ms, the least probable delays (g(d)=1) are tested every 200 ms approximately, and the most probable delays (g(d)=8) are tested every 25 ms approximately.

Owing to the efficiency of the path search carried out according to the method of the invention, it may be considered not to provide a tracking and fine synchronization loop in the reception arms 10, 20 of the rake receiver, which constitutes a very advantageous simplification as indicated hereabove.

In the foregoing, the invention is described in the application to downlinks in a radiotelephone system. It will be understood that the invention may be applied similarly to the uplinks when the receiver of the base station includes a diversity receiver (see U.S. Pat. No. 5,109,390). In the latter case, the reference sequence used for calculating the reception energies is not a sequence transmitted on a pilot channel but the spreading sequence used in the communications.

I claim:

1. A method for selecting multiple propagation paths retained for receiving messages transmitted in a code-division multiple access (CDMA) radiocommunication system, each path being identified by a delay which is applied to at least one spreading sequence for determining a correlation between a received signal and said spreading sequence, wherein, for each selected delay, reception energy of a CDMA signal consisting of a correlation between the received signal and a reference spreading sequence is estimated, wherein other delays are successively tested by estimating the reception energy for each tested delay and, when the reception energy for a tested delay is greater than at least one of the reception energies associated with the previously selected delays, said tested delay is substituted for the one of the previously selected delays for which the reception energy is the lowest, and wherein the tested delays are chosen with a choice probability having a maximum for the shortest of the selected delays.

2. A method according to claim 1, wherein the law of the choice probability of the tested delays is an elevated Rayleigh function.

3. A method according to claim 1, wherein the law of the choice probability of the tested delays has a peak about the value of the shortest of the selected delays, the time duration of said peak being between 5 and 20 $\mu$s.

4. A method according to claim 1, wherein the tested delays are randomly chosen in a time window of predetermined duration the position of said window being defined with respect to the value of the shortest of the selected delays.

5. A method according to claim 4, wherein the ratio between the maximum probability of choice for a delay in the window and the minimum probability of choice for a delay in the window is between 5 and 15.

6. A method according to claim 1, wherein the law of the choice probability of the tested delays is a discretized elevated Rayleigh function.

* * * * *